US012776008B2

(12) United States Patent
Horikawa

(10) Patent No.: US 12,776,008 B2
(45) Date of Patent: Oct. 27, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yuta Horikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 275 days.

(21) Appl. No.: 18/629,990

(22) Filed: Apr. 9, 2024

(65) Prior Publication Data

US 2024/0354905 A1 Oct. 24, 2024

(30) Foreign Application Priority Data

Apr. 18, 2023 (JP) ................................ 2023-067814

(51) Int. Cl.
*G06T 5/60* (2024.01)

(52) U.S. Cl.
CPC ...... *G06T 5/60* (2024.01); *G06T 2207/20016* (2013.01); *G06T 2207/20084* (2013.01)

(58) Field of Classification Search
CPC ............. G06T 5/60; G06T 2207/20016; G06T 2207/20084
See application file for complete search history.

(56) References Cited

U.S. PATENT DOCUMENTS

2019/0378014 A1* 12/2019 Yamamoto ........... G06N 3/0495
2022/0198671 A1* 6/2022 Price ...................... G06N 3/045
2023/0073835 A1* 3/2023 Yin ........................ G06V 10/82
2024/0005528 A1 1/2024 Horikawa
2024/0095934 A1 3/2024 Horikawa
2024/0169202 A1* 5/2024 Sorakado ............... G06N 3/045
2024/0202532 A1* 6/2024 Salah ................... G06N 3/0464
2024/0354899 A1 10/2024 Horikawa

FOREIGN PATENT DOCUMENTS

JP 2019-212206 A 12/2019
KR 20200037700 A * 4/2020 ............... G06N 3/04

OTHER PUBLICATIONS

Mo, H. et al., "Frequency Attention Network Blind Noise Removal for Real Images" ACCV 2020 (Feb. 2021) pp. 1-17 (Year: 2021).*
Zhao, B. et al., "Diversified Visual Attention Networks for Fine-Grained Object Classification" IEEE Transaction on Multimedia (Jan. 2017) pp. 1-11, arXiv:1606.08572v2.
Mo, H. et al., "Frequency Attention Network Blind Noise Removal for Real Images" ACCV 2020 (Feb. 2021) pp. 1-17.
Guo, S. et al., "Toward Convolutional Blind Denoising of Real Photographs" arXiv:1807.04686v2 (Apr. 2019) pp. 1-11.

* cited by examiner

*Primary Examiner* — Oneal R Mistry
*Assistant Examiner* — Jongbong Nah
(74) *Attorney, Agent, or Firm* — Carter, DeLuca & Farrell LLP

(57) ABSTRACT

In an information processing apparatus, an image is input to a first neural network in which an attention mechanism that performs image processing for improving image quality is included; a redundant attention mechanism is detected by determining whether or not a weight of attention processing generated in a process of the image processing is active; and acquire a second neural network by deleting the redundant attention mechanisms detected by the detection from the first neural network, and perform machine learning with the second neural network.

22 Claims, 11 Drawing Sheets

100

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium.

Description of the Related Art

In recent years, methods using neural networks have been developed in an image processing technology for improving the image quality of an image. For example, neural networks are used to achieve image processing for improving image quality such as noise removal, blur removal, and super resolution.

Additionally, for example, in Document 1 (Frequency Attention Network: Blind Noise Removal for Real Images, Hongcheng Mo et al., 2020.), an attention mechanism is proposed as one of the elements constituting the neural network. In the attention mechanism, when a feature amount is input, a weight of the feature amount is generated, and attention processing for emphasizing an important element in the feature amount is realized by using the generated weight.

By introducing this attention mechanism into a neural network, the performance of various image processing tasks can be improved, and image quality can also be improved in the aforementioned image processing for improving image quality.

However, in general, the processing load of the attention processing is large, and the processing speed is reduced when the attention processing is excessively introduced into the network.

In contrast, in Japanese Unexamined Patent Application Publication No. 2019-212206, by utilizing the fact that the weight of the input feature amount is generated by the attention processing, it is determined that the calculation processing for generating the feature amount having a small weight is redundant, and the calculation processing is reduced.

However, the processing in Japanese Patent Application Laid-Open Publication No. 2019-212206 is intended to reduce the number of filters and the number of dimensions of the feature amount, and is not intended to reduce a series of processing steps of the feature amount, and therefore, the processing load of the attention mechanism is still large.

SUMMARY OF THE INVENTION

An information processing apparatus comprising: at least one processor; and a memory coupled to the at least one processor, the memory storing instructions that, when executed by the at least one processor, cause the at least one processor to: perform image processing by inputting an image to a first neural network in which an attention mechanism that performs image processing for improving image quality is included; detect a redundant attention mechanism by determining whether or not a weight of attention processing generated in a process of the image processing is active; and acquire a second neural network by deleting the redundant attention mechanism detected by the detection from the first neural network, and; and perform machine learning with the second neural network.

Further features of the present invention will become apparent from the following description of embodiments with reference to the attached drawings.

DESCRIPTION OF THE EMBODIMENTS

First Embodiment

Hereinafter, with reference to the accompanying drawings, favorable modes of the present invention will be described using embodiments. In each diagram, the same reference signs are applied to the same members or elements, and duplicate descriptions will be omitted or simplified.

Figure 1:
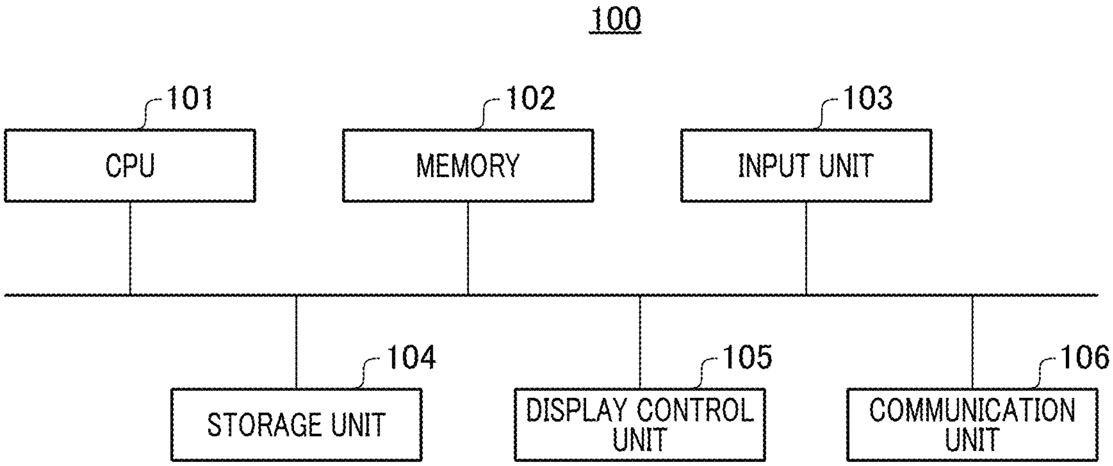
FIG. 1 is a functional block diagram showing an example of a configuration of an information processing apparatus 100 according to the first embodiment of the present invention.

FIG. 1 is a diagram showing an example of the hardware configuration of an information processing apparatus 100 according to the first embodiment of the present invention. The information processing apparatus 100 has a CPU 101 serving as a computer, a memory 102, for example, a RAM and ROM, an input unit 103, for example, a keyboard and a mouse, and a storage unit 104 serving as a storage medium that stores computer programs and the like.

The information processing apparatus 100 also includes a display control unit 105 that generates a display signal for displaying an image and the like on a liquid crystal display, an organic display, and the like, a communication unit 106 for communicating with the outside of the information processing apparatus 100, and the like.

Figure 2:
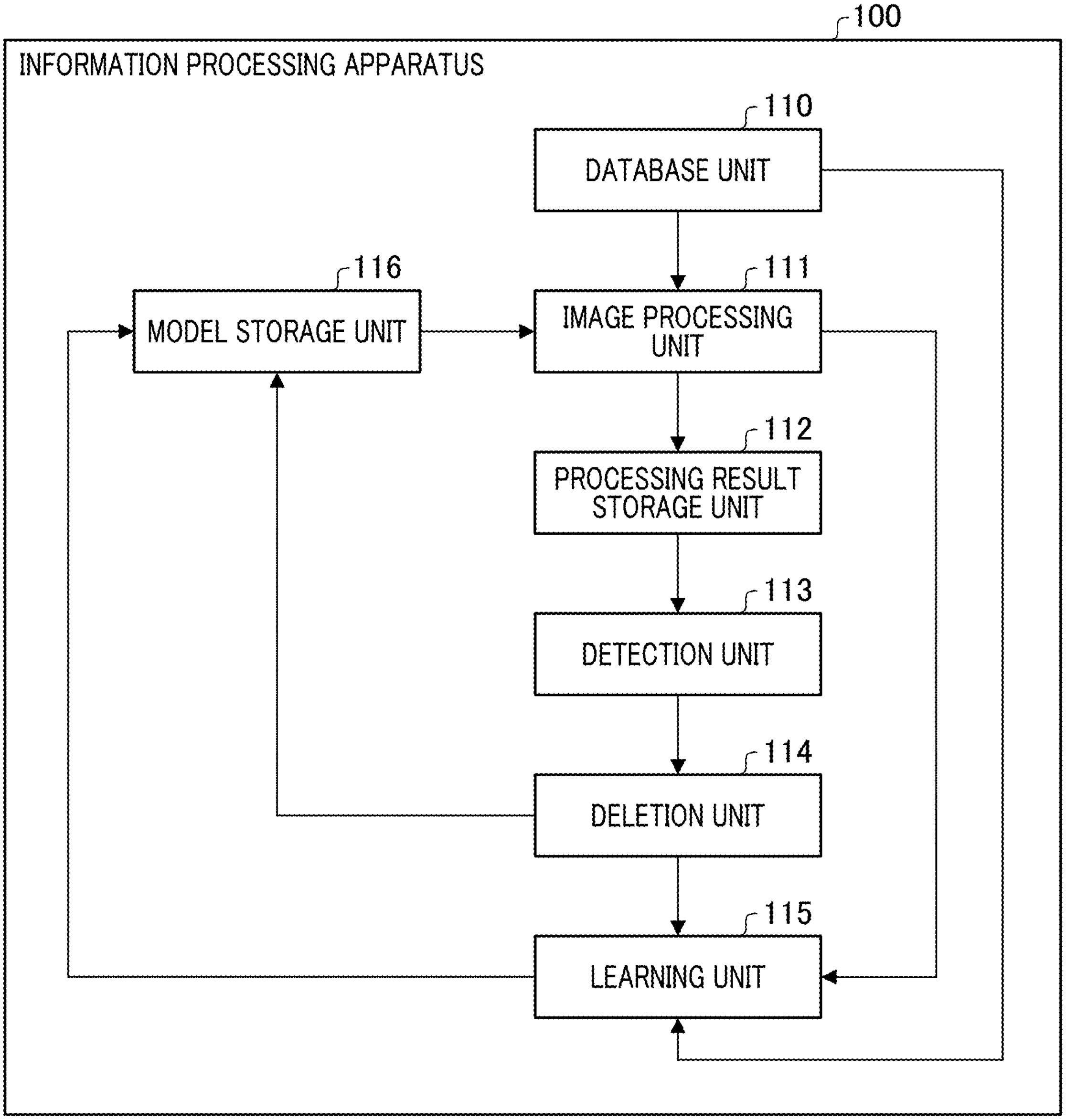
FIG. 2 is a diagram showing an example of the hardware configuration of the information processing apparatus 100 according to the first embodiment of the present invention.

FIG. 2 is a functional block diagram showing a configuration example of an information processing apparatus according to the first embodiment. Note that some of the functional blocks shown in FIG. 2 are realized by causing, for example, a CPU serving a computer (not illustrated) included in the information processing apparatus, to execute a computer program stored in a memory serving as a storage medium (not illustrated).

However, some or all of them may be realized by hardware. As the hardware, a dedicated circuit (ASIC), a processor (reconfigurable processor, DSP), and the like can be used.

Additionally, each functional block as shown in FIG. 2 does not have to be built in the same housing, and may be configured by separate devices connected to each other via a signal path. Note that the above explanation regarding FIG. 2 also applies to FIG. 4, FIG. 5, FIG. 7, FIG. 10, and FIG. 11.

The information processing apparatus 100 as shown in FIG. 2 is provided with a database unit 110, an image processing unit 111, a processing result storage unit 112, a detection unit 113, a deletion unit 114, a learning unit 115, and a model storage unit 116.

In the model storage unit 116, a neural network in which attention that has been learned in advance is incorporated is stored. The database unit 110 is a database that stores images for image quality evaluation and images for learning image processing for improving image quality.

The image processing unit 111 executes predetermined image processing when an input image is provided by using a neural network stored in the model storage unit 116. That is, the image processing unit 111 executes an image processing step that performs the image processing by inputting an image quality evaluation image to the first neural network in which the attention mechanism for executing the image processing for improving image quality is incorporated. The processing result storage unit 112 stores a weight of the attention processing generated in the process of the image processing that has been executed by the image processing unit 111.

The detection unit 113 performs the activation determination for a weight generated by the attention mechanism, and detects a redundant attention mechanism from the attention of the neural network stored in the model storage unit 116. Specifically, the detection unit 113 detects a redundant attention mechanism by determining whether or not the weight of the attention processing generated in the process of the image processing is active.

The deletion unit 114 deletes the redundant attention mechanism detected by the detection unit 113 from the first neural network stored in the model storage unit 116, and acquires a new second neural network. The learning unit 115 learns the second neural network acquired by the deletion unit 114.

Figure 3A:
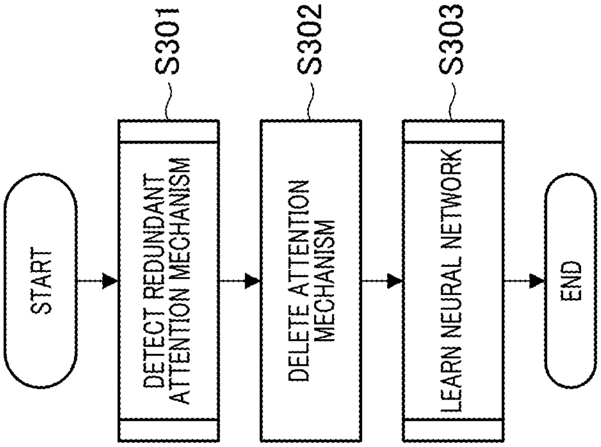
FIGS. 3A to 3C are flowcharts illustrating a flow example of an information processing method in the information processing apparatus according to the first embodiment.
Figure 3B:
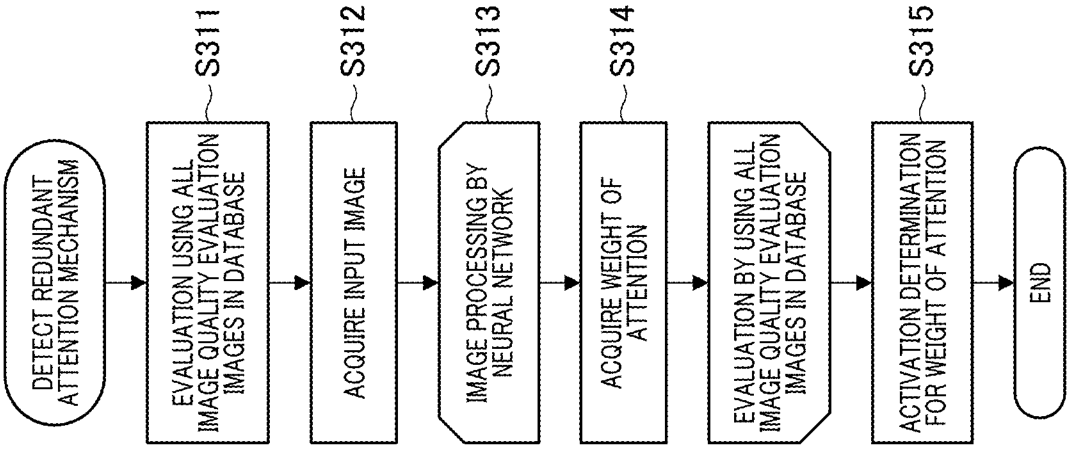
Figure 3C:
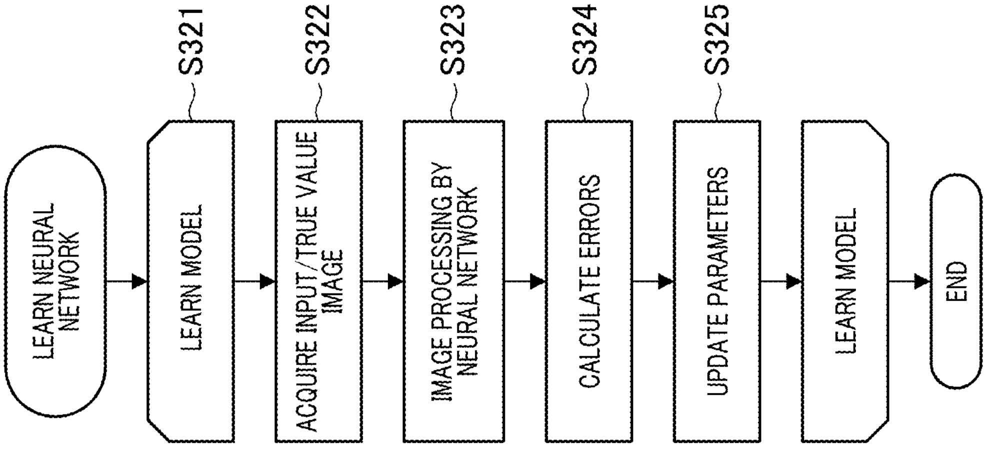

FIGS. 3A to 3C are flowcharts illustrating a flow example of an information processing method in an information processing apparatus according to the first embodiment. Note that the CPU 101 serving as a computer in the information processing apparatus 100 executes a computer program stored in the storage unit 104, and thereby, the operations of each of the steps in the flowcharts of FIG. 3A to 3C are sequentially performed.

Next, with reference to the functional block diagram of FIG. 2 and the flowchart of FIG. 3, the detailed contents of the processing of acquiring a neural network for the image processing for improving image quality in which an attention mechanism is incorporated will be explained.

First, the process of detecting a redundant attention mechanism in step S301 of FIG. 3 a will be explained. In step S301, redundant attention is detected from a neural network that is stored in the model storage unit 116 and in which an attention mechanism learned in advance is incorporated.

Here, a detailed processing flow of step S301 is shown in FIG. 3B. In step S311, first, a weight of attention processing is acquired using the image quality evaluation image stored in the database unit 110 in order to detect a redundant attention mechanism. The processing is repeated until the weights of attention processing for all image quality evaluation images in the database unit 110 are acquired.

As the image quality evaluation image stored in the database unit 110, an image is used in which a part to be emphasized in evaluating the image quality can be evaluated. For example, in a case in which the sharpness of an image is to be emphasized in the image quality of an image processing result, the sharpness and reproducibility of edges and colors are important.

In this case, a frequency chart indicating the fluctuation of the frequency band in the image and a color chart in which regions in the image are divided for each color is used in the image quality evaluation image in order to evaluate the sharpness and reproducibility of the edge and the color.

In addition, for example, in a case in which the visibility of characters is to be emphasized, a character chart reproduces characters is used. Additionally, in a case in which the visibility of a specific object, for example, the visibility of an automobile is to be emphasized in image quality, an image in which an automobile is captured is used.

In step S312, the image quality evaluation image stored in the database unit 110 is acquired as an input image to the network for performing the image processing for improving image quality. In step S313, the image processing unit 111 executes the image processing for improving image quality on the input image acquired in step S312, by using the learned neural network to which the attention mechanism that is stored in the model storage unit 116 is introduced. Additionally, in step S313, the loop processing starts.

Note that the neural network according to the first embodiment executes noise removal as the image processing for improving image quality by using, for example, U-Net as described in Document 2 (Toward Convolutional Blind Denoising of Real Photographs, Shi Guo et al., 2019). That is, in Document 2, a Convolutional Neural Network (CNN) that realizes noise removal is described, and the CNN is composed of a large number of convolution layers and activation layers.

Additionally, in the network of Document 2, noise removal is performed by using a network referred to as "U-Net" having a U-shaped structure in order to realize that image processing for improving image quality such as noise removal and super-resolution in particular. In the first embodiment, an example using the above U-Net will be explained.

Figure 4:
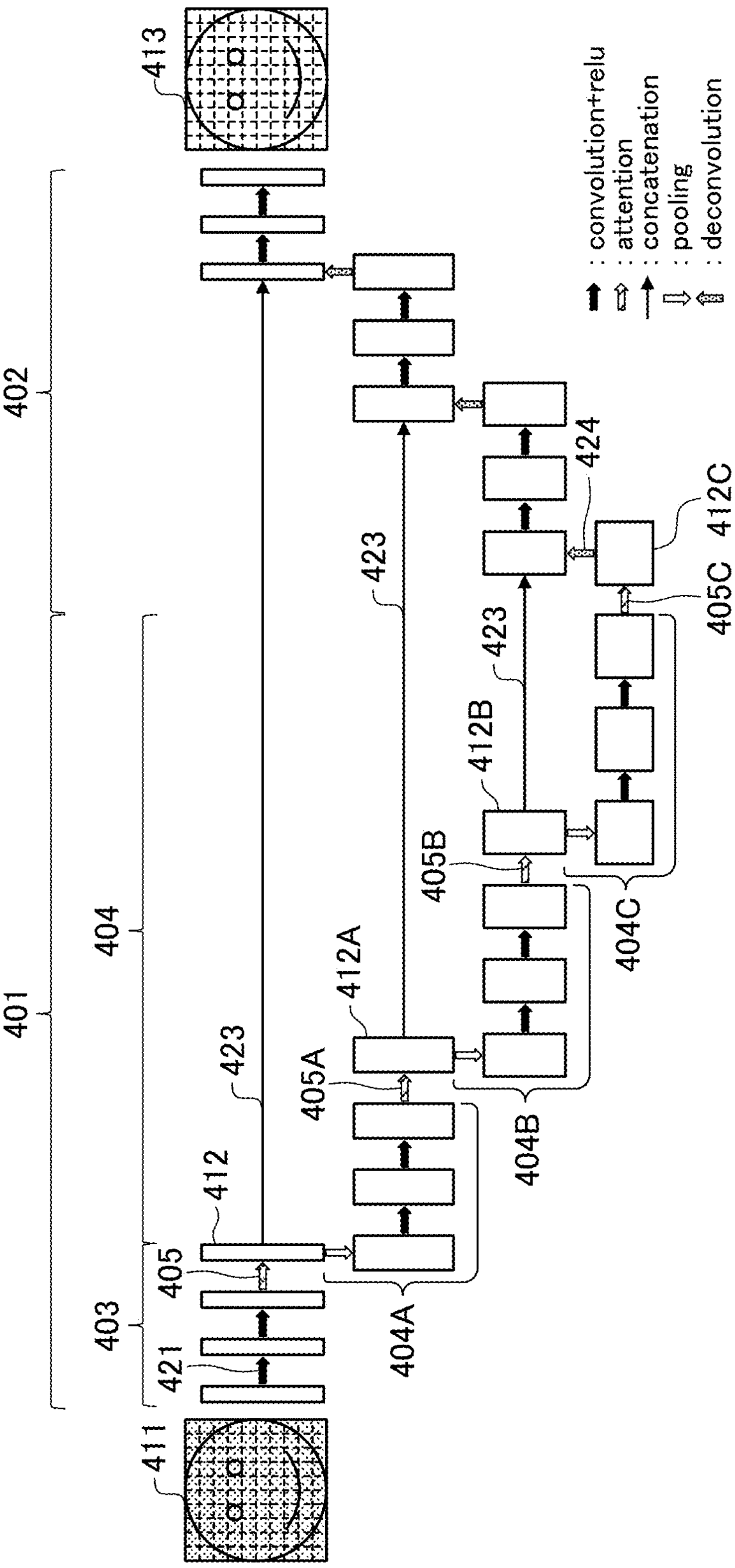
FIG. 4 is a functional block diagram showing a configuration example of a neural network according to the first embodiment.

FIG. 4 is a functional block diagram illustrating a configuration example of a neural network according to the first embodiment. The neural network according to the first embodiment as shown in FIG. 4 is divided into an encoder unit 401 that generates a feature amount while compressing an image and a decoder unit 402 that restores an image from the compressed feature amount.

That is, the first and second neural networks in the first embodiment have an encoder unit that generates a plurality of feature amounts, and a decoder unit that restores the plurality of feature quantities as an image of a desired image processing execution result. More specifically, the first and second neural networks have an encoder unit that generates feature amounts having a plurality of resolutions, and a decoder unit that restores feature amounts of the plurality of resolutions as an image of a desired image processing execution result.

First, in the encoder 401, the feature amounts having different resolutions and channels of the input image 411 are generated. Thereafter, while deconvolution is performed by the encoder 401 on the feature amount compressed to the end by the decoder 402, the number of channels is reduced and the resolution is increased, and the feature amount is restored as an image.

Finally, a noise-removed image 413 can be obtained as a high-quality image on which image processing including predetermined noise removal processing has been performed. That is, when an image with noise is input, the first and second neural networks output an image from which noise has been removed.

Although in the first embodiment, the network configured as described above is used, the network may have any structure as long as the network realizes high image quality such as generation of feature amounts of a plurality of resolutions, and the position and the number of attention mechanisms are not limited thereto.

Details of the neural network according to the first embodiment as shown in FIG. 4 will be explained below. For example, the input image 411 is acquired from an image capturing apparatus and input to a high-resolution feature amount encoder unit 403. In the input image 411 that is input, a high-resolution feature amount 412 is generated by a plurality of convolution processes and an activation process relu in the high-resolution feature amount encoder unit 403.

Note that the activation processing relu (Rectified Linear Unit) is processing using a function in which the output value is always 0 when the input value is 0 or less, and the output value is the same value as the input value when the input value is more than 0.

As described above, in the network of the first embodiment, processing 421 of applying a plurality of convolutions and the activation process relu is performed on the input image 411 including noise to generate a high-resolution feature amount. Furthermore, the attention processing is executed on the generated feature amount by attention processing 405 to generate the feature amount 412.

In a low-resolution feature amount encoder unit 404A, the pooling processing on the feature amount 412 is performed and a plurality of convolutions and the activation processing relu are performed to generate a low-resolution feature amount. Furthermore, the attention processing 405A is executed on the feature amount generated by the low-resolution feature amount encoder unit 404A.

On the feature amount 412A on which the attention processing 405A has been executed, pooling processing is further performed in a low-resolution feature amount encoder unit 404B to reduce the resolution, and the feature amount is compressed. Additionally, a feature amount 412B is generated by performing the attention processing 405B.

Subsequently, the resolution is further reduced by the pooling processing in a low-resolution feature amount encoder unit 404C to compresses the feature amount. Additionally, a feature amount 412C is generated by performing the attention processing 405C.

As described above, the low-resolution feature amount encoder unit 404 of the first embodiment includes the attention processing 405A to 405C at the end of the path for generating the feature amount. Note that the attention processing 405A to 405C are attention processing for performing weighting the feature amount in the spatial direction or the attention processing for weighting the feature amount in the channel direction.

That is, the attention mechanism incorporated in the first neural network includes an attention mechanism that generates a weight in the spatial direction of the input feature amount or an attention mechanism that generates a weight for the channel direction of the input feature amount.

Figure 5A:
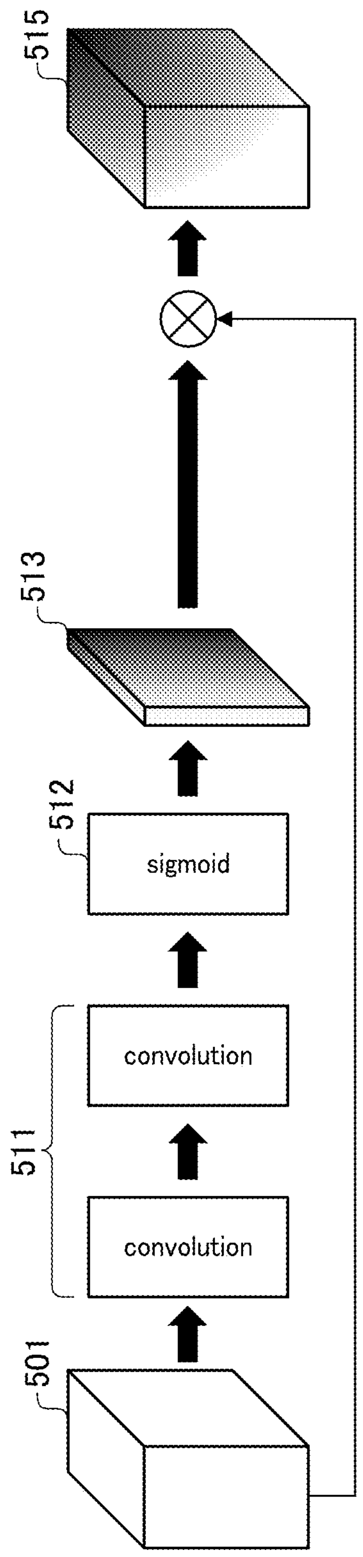
FIGS. 5A and 5B are functional block diagrams for explaining attention processing according to the first embodiment.
Figure 5B:
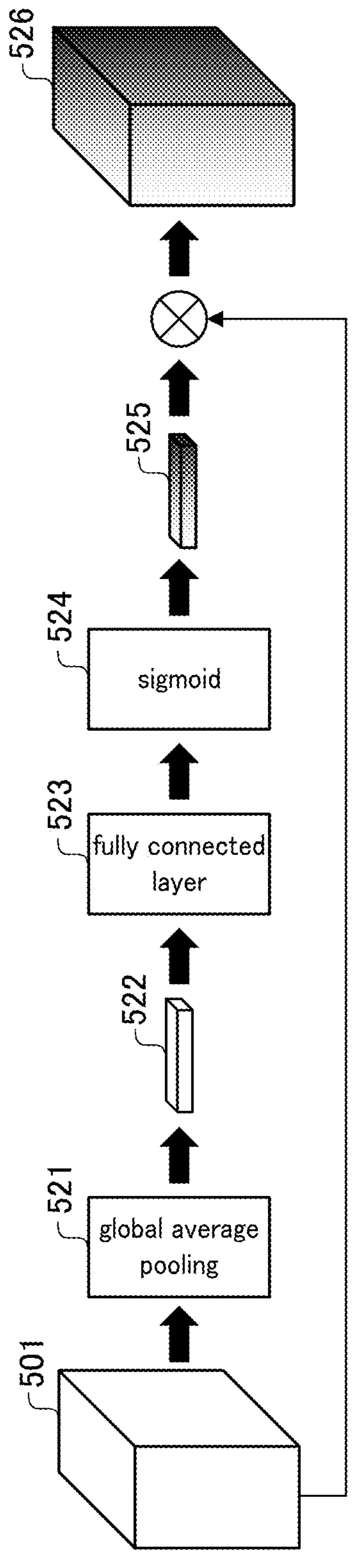

FIG. 5A and FIG. 5B are functional block diagrams for explaining the attention processing according to the first embodiment, and FIG. 5A is a diagram showing an example of the attention processing for performing the weighting in the spatial direction. Assuming that the size of the input feature amount 501 is the feature amount of the height H, the width W and the channel C, the feature amount of the height H, the width W and the channel 1 is generated by performing a plurality of convolution processing 511 on the input feature amount 501.

Subsequently, the processing 512 using a sigmoid function is applied to the generated feature amount, and a weight 513 in a spatial direction having the value of 0 to 1 is generated. Furthermore, the generated weight 513 is multiplied by the input feature amount 501, so that the feature amount 515 weighted in the spatial direction is acquired.

In contrast, FIG. 5B is a diagram illustrating an example of the attention processing in which weighting is performed in the channel direction. With respect to the input feature amount 501, a feature amount 522 of height 1, width 1, and channel C is generated by global average pooling processing 521.

On the generated feature amount, the sigmoid function 524 is further applied through the fully connected layer processing 523, and thereby, a weight 525 in the channel direction is generated. Then, the generated weight 525 is multiplied by the input feature amount 501, so that a feature amount 526 weighted in the channel direction is acquired. Note that, in the first embodiment, it is assumed that attention in the spatial direction is used.

Returning to the explanation of FIG. 3, in step S314, all the weights of the attention processing generated in the process of executing the image processing in step S313 are acquired, and the acquired weights of the attention processing are stored in the processing result storage unit 112 in association with the input image. The above processing is executed by loop processing on all the image quality evaluation images in the database, and a set of the image quality evaluation image and the weight of the attention processing for the image is stored in the processing result storage unit 112.

In step S315, the detection unit 113 determines whether the weight of the attention processing is active or inactive for each attention mechanism, by using the set of the image quality evaluation image and the weight of the attention processing stored in the processing result storage unit 112.

The attention mechanism in which the weight of the attention processing is determined to be inactive is determined to be redundant, and the redundant attention mechanism is detected. Here, step S315 functions as a detection step of detecting a redundant attention mechanism by determining whether or not the weight of the attention processing generated in the process of the image processing step is active.

Note that, in the first embodiment, the statistical amounts of the weight values of the attention processing are calculated, and whether or not the weight of the attention processing is active is determined according to the statistical amounts. Specifically, as a method for determining whether the weight of the attention processing is active or inactive, a variance value of the weight generated by the attention mechanism is used, and the variance value of the weight generated by the attention mechanism is calculated for each attention mechanism. When the calculated variance value is equal to or less than a predetermined threshold, the weight is determined to be inactive, and when the calculated variance value is equal to or more than the threshold, the weight is determined to be active.

Figure 6:
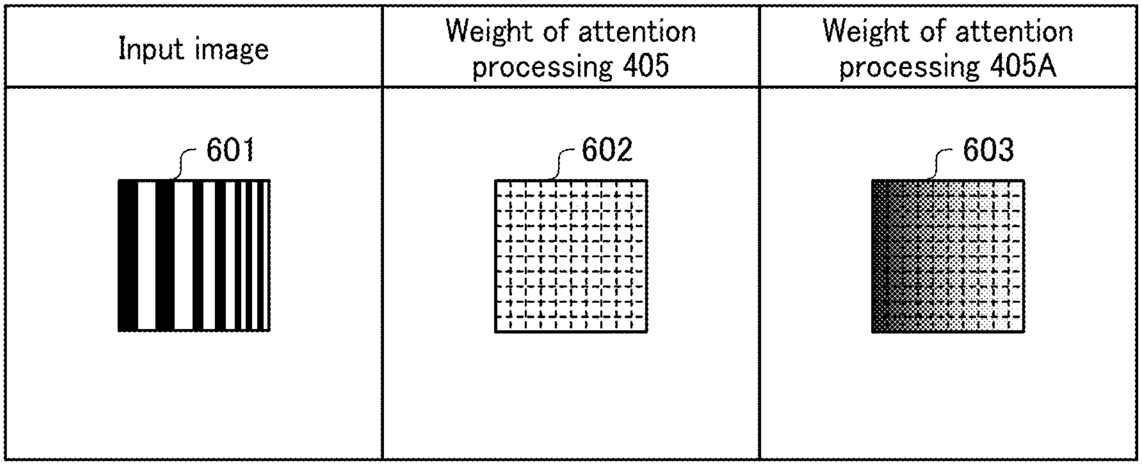
FIG. 6 is a diagram for explaining activation determination for a weight of attention processing in a case in which a frequency chart is input.

FIG. 6 is a diagram for explaining the activation determination for a weight of the attention processing in a case in which a frequency chart is input. An input image 601 is a frequency chart that is one of the image quality evaluation images, and is provided as an input to the neural network.

The weight of the attention processing of the attention mechanism incorporated in the neural network when the input image 601 is given is acquired. That is, for example, a weight 602 of the attention processing 405 and a weight 603 of the attention processing 405A are respectively acquired.

At this time, it is assumed that the values of all the elements of the weight 602 of the attention processing 405 are substantially constant. In contrast, it is assumed that, with respect to the weight 603 of the attention processing 405A, the weight increases as the frequency of the input image 601 decreases.

That is, even if the weight 602 of the attention processing 405 is used, the weighting is not performed on the feature amount, and thus the attention mechanism that generates this weight can be determined to be redundant. As described above, the value of the weight of the attention processing varies or does not vary for each element depending on the input image. Accordingly, in the first embodiment, the variance value of the weight is calculated. Therefore, when the value varies depending on the element, the variance value increases, and when the variation is small, the variance value decreases.

Then, the active or inactive determination results for the weight of the attention processing are totaled for all the image quality evaluation images for each attention mechanism. In the first embodiment, it is determined whether or not the attention mechanism is redundant by a majority decision of active or inactive, and if there are more inactive weights of the attention processing, it is determined that the attention mechanism that generates the weights of the attention processing is redundant.

That is, it is detected that the attention mechanism in which there are more inactive weights of attention processing than the active weights of attention processing, among weights of the attention processing acquired for each attention mechanism in a case in which one or more image quality evaluation images are given, is redundant.

Note that the method below may be used as another method for the determination of the activation for the weight of the attention processing and detection of the redundant attention mechanism. That is, for example, first, the average value of the variances of the weights of the attention processing for all the image quality evaluation images is calculated for each attention mechanism. Next, the weight of the attention processing, which is the average value of the variances equal to or less than the defined threshold, may be determined to be inactive and the attention mechanism may be determined to be redundant.

That is, the average value of the variances of the weights of the attention processing acquired when one or more image quality evaluation images are given may be calculated, and the attention mechanism that generates the weight of the attention processing of which the average value is less than a predetermined threshold may be detected as redundant.

Thus, in step S315, the activation determination for the weight of attention is performed and a redundant attention mechanism is detected, and then the process proceeds to step S302. In step S302, the deletion unit 114 deletes the redundant attention mechanism detected in step S315 from the structure of the neural network that is stored in the model storage unit 116.

As a result, a new network structure is acquired, and the acquired new network structure is stored in the model storage unit 116. Here, the step S302 functions as a deletion step of deleting the redundant attention mechanism detected in the detection step from the first neural network and acquiring a new second neural network.

Figure 7:
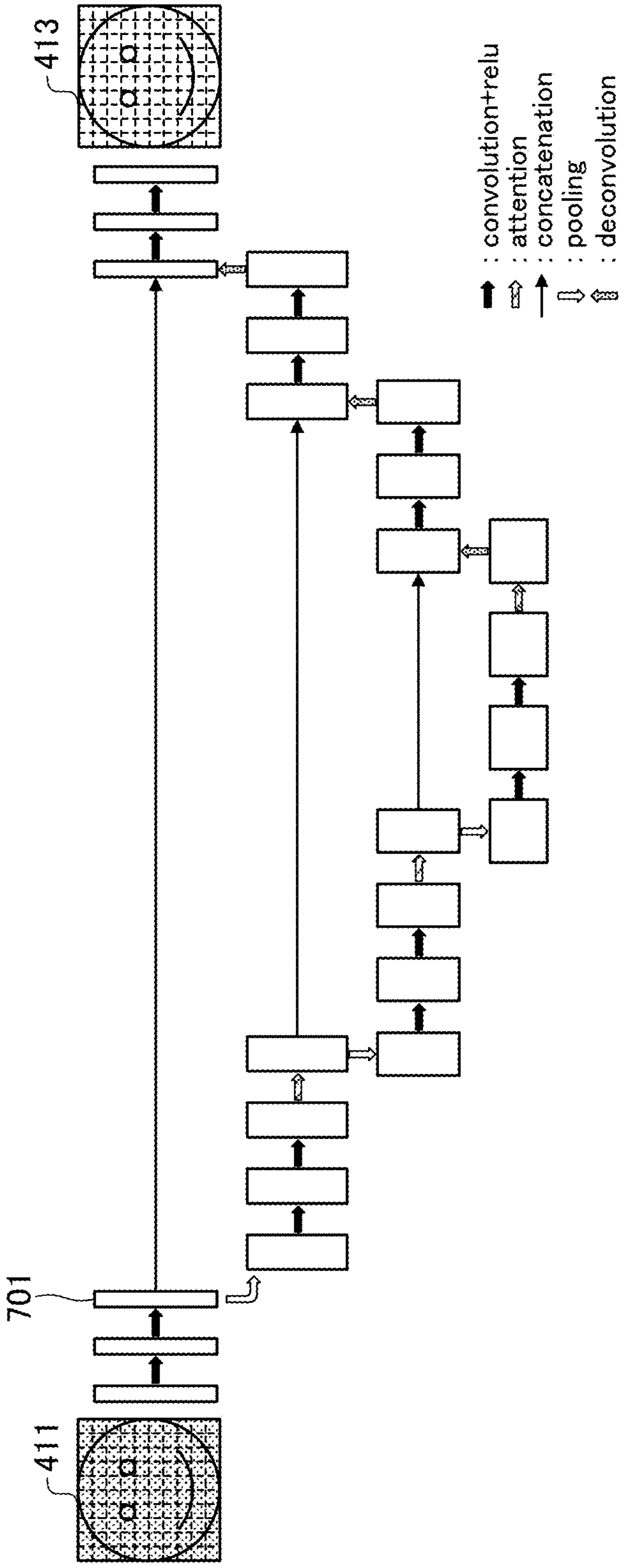
FIG. 7 is a functional block diagram showing a configuration example of a neural network newly acquired according to the first embodiment.

FIG. 7 is a functional block diagram showing an example of the configuration of a neural network that is newly acquired according to the first embodiment, and shows an example of the structure of the neural network that has been newly acquired as described above. In the neural network of FIG. 7, the attention processing 405 determined to be redundant in the original neural network of FIG. 4 is deleted, and a feature amount 701 generated without executing the attention processing 405 is propagated in the network.

Next in step S303 of FIG. 3, the neural network having the new structure acquired in step S302 is learned. Here, step S303 functions as a learning step that learns the second neural network. FIG. 3C is a flowchart showing an example of detailed processing flow of step S303.

In step S321, the loop processing of the learning of the neural network starts. By this process, the parameters such as the weight and bias of the network are repeatedly updated. That is, at the start of learning, the neural network to which initial parameter values are given is read, and thereafter, while updating the parameters of the neural network by repeatedly learning, the parameters are stored in the model storage unit 116. At this time, the learning ends by repeating a predetermined number of times.

In step S322, the database unit 110 outputs an input image to the image processing unit 111 and a true value image to the learning unit 115, from among the set consisting of the input image and the true value image. In the first embodiment, a clean image without noise is used as the true value image so that noise removal is executed as image processing. Additionally, a noise-added image obtained by adding noise to an input image is used.

In step S323, the image processing unit 111 performs image processing by inputting the input image obtained in step S322 to a neural network, and obtains the result. The obtained image processing results are output to the learning unit 115.

In step S325, the learning unit 115 calculates an error value by using the true value image obtained in step S322 and the image processing result obtained in step S323. In step S325, the parameters of the neural network are updated by the back propagation method using the error value calculated in step S324.

The neural network having the updated parameters is stored in the model storage unit 116. The processes from step S321 to step S325 are repeatedly performed by loop processing, and the learning of a neural network having a new structure for executing the image processing for improving image quality is performed.

The method for determining whether the attention layer is active or inactive based on, for example, the variance value of the weights generated by the attention mechanism and deleting a redundant attention layer has been explained above. Note that the score serving as an index for determining whether the attention layer is active or inactive is not limited to the variance value. Any index may be used as long as it can be used for a similar purpose.

For example, standard deviation may be used as another index. Alternatively, as another index for determining the degree of distribution, an index, for example, skewness and kurtosis, may be used, or a combination thereof may be used as an index for achieving the purpose.

As described above, according to the first embodiment, in a neural network in which noise removal processing is performed, redundant attention can be deleted and a neural network with a faster processing speed can be acquired.

<Modification 1>

In the first embodiment, whether the weight of the attention processing is active or inactive is determined by using the variance value of the weight and the like. In Modification 1, another method for determining whether the weight of the attention processing in the spatial direction is active or inactive in a case in which a frequency chart is used for the image quality evaluation set will be explained with reference to FIG. 6.

The input image 601 that is a frequency chart is given as an input to a neural network capable of executing the image processing for improving image quality. This frequency chart has a characteristic in which frequencies increase from the left end portion of the image toward the right end portion thereof. At this time, the weight 602 of attention processing 405 incorporated in the neural network, the weight 603 of the attention processing 405A, and the like are obtained.

Here, in Modification 1, with respect to the weight of the attention processing acquired when the frequency chart is given as an input of the first neural network, the region is divided for each frequency band, and a representative value of the weight is calculated for each region. The average value or maximum value of the weights is used as the representative value.

Next, an absolute difference value of the representative value between adjacent regions is calculated. When the absolute difference value is higher than a predetermined value (for example, 0) in any adjacent region, the weight of the attention processing is determined to be active. Additionally, when the difference value is equal to or less than a predetermined threshold, the weight of the attention processing is determined to be inactive.

If such a determination method is used, the weight 602 of the attention processing 405 can be determined to be inactive because the weight value is constant regardless of the frequency band. Additionally, the weight 603 of the attention processing 405A can be determined to be active because the value of the weight varies depending on the frequency band.

<Modification 2>

Figure 8:
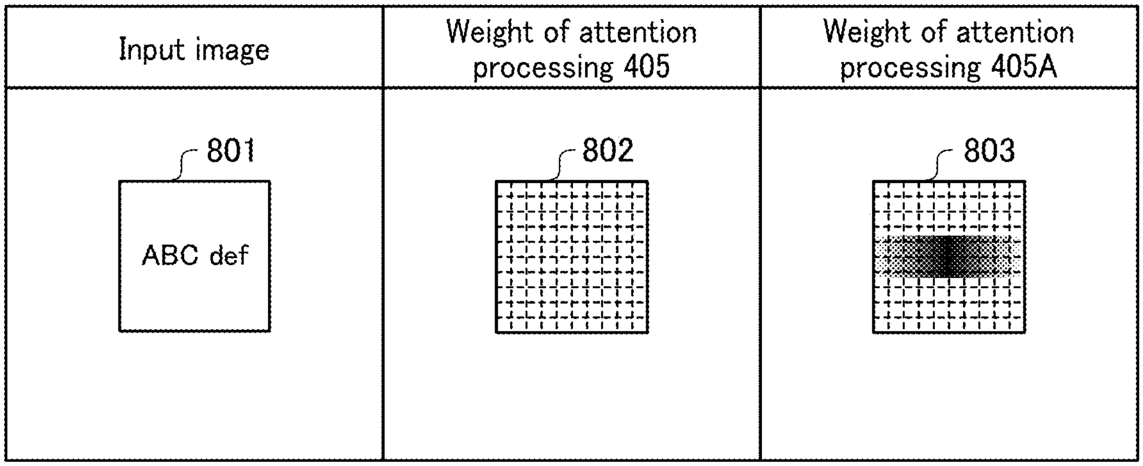
FIG. 8 is a diagram for explaining the activation determination for a weight of the attention processing in which a character chart is input.

In Modification 2, a method for determining whether the weight of the attention processing is active or inactive in the spatial direction when a character chart is used in the image quality evaluation set will be explained with reference to FIG. 8. FIG. 8 is a diagram for explaining the activation determination for a weight of the attention processing in which a character chart is used as an input.

In FIG. 8, an input image 801 that is a character chart is given as an input to a neural network capable of executing the image processing for improving image quality. In this character chart, a character part and a background other than the character part is reflected in the image. At this time, a weight 802 of the attention process 405 and a weight 803 of the attention processing 405A that has been incorporated in the neural network are obtained. Here, the character chart is divided into a character region and a background region, and the representative value of the weight is calculated for each region.

In this case, for example, a character detector is used in order to separate the character region and the background region. Additionally, the average value or the maximum value of the weights is used as the representative value. Next, the absolute difference value of the representative values between the character region and the background region is calculated. At this time, when the absolute difference value is larger than 0, it is determined that the weight of the attention processing is active.

If such a determination method is used, the weight 802 of the attention process 405 is determined to be inactive because there is no difference in the weight value between the character region and the background region. Additionally, the weight 803 of the attention processing 405A is determined to be active because a difference in the weight value between the character region and the background region is produced. Additionally, such a determination method can also be realized by using an object detector that detects an object image in which a specific object is reflected and a specific object, instead of a character chart.

That is, the weight of attention processing acquired when a character chart or an object image is given as an input to the neural network is divided into a character region or an object region and a background region, and a representative value of the weight is calculated for each region. Additionally, a difference value of the representative values of the weights between the character region or the object region and the background region is calculated, and when the difference value is equal to or less than a predetermined threshold, it is determined that the weight of the attention processing is inactive.

<Modification 3>

Figure 9:
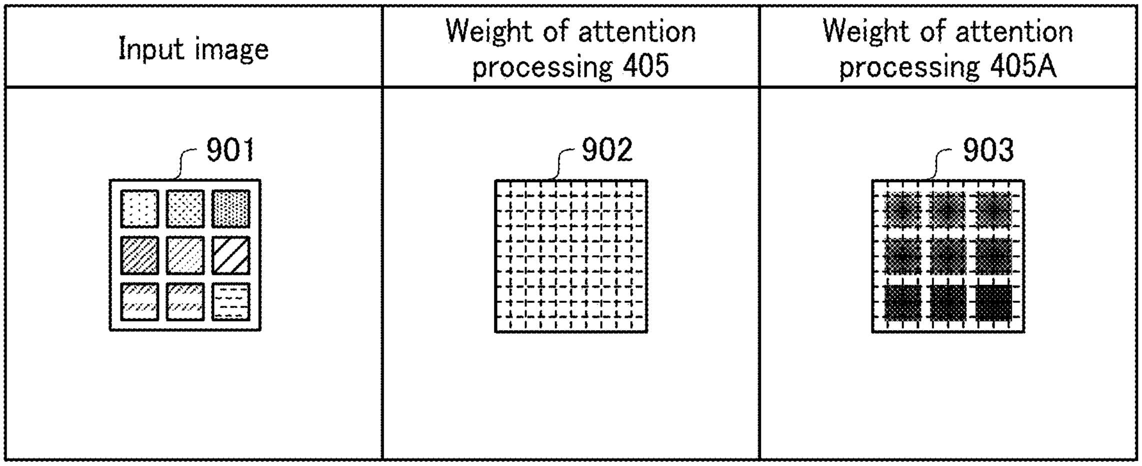
FIG. 9 is a diagram for explaining the activation determination for a weight of the attention processing in which a color chart is input.

In Modification 3, a method for determining whether the weight of the attention processing in the spatial direction is active or inactive in a case in which a color chart is used in the image quality evaluation set will be explained with reference to FIG. 9. FIG. 9 is a diagram for explaining the activation determination on a weight of the attention processing in which the color chart is an input. In FIG. 9, a color chart 901 that is an input image is given as an input to a neural network capable of executing the image processing for improving image quality.

In the color chart 901 shown in FIG. 9, square color regions and backgrounds having different colors are reflected in the image. At this time, a weight 902 of the attention process 405 and a weight 903 of the attention processing 405A incorporated in the neural network are obtained. Here, a representative value of the weight is calculated for each color region of the color chart.

Specifically, among the weights of attention processing obtained when a color chart is given as an input to the neural network, regions are divided for each color, and a representative value of the weights is calculated for each region.

Each color region can be divided by using the fact that the pixel values of the image are constant. Next, two color regions are randomly sampled from all the color regions and a pair of color regions is formed. The absolute difference value of the representative value is calculated between the formed pairs of color regions.

At this time, if there are many pairs of all of the color regions whose absolute difference values are greater than 0, the weight of attention processing is determined to be active. If such a determination method is used, the weight 902 of the attention processing 405 is determined to be inactive because there is no difference in the weight value between each color region.

Additionally, the weight 903 of the attention processing 405A is determined to be active because a difference in the value of the weight in each color region is produced. Thus, the difference value of the representative values of the weights between the regions divided for each color is calculated, and when the difference value is equal to or less than a predetermined threshold, the weight of the attention processing is determined to be inactive.

As described above, the image quality evaluation image input to the first neural network may be various images. That is, the image quality evaluation image includes at least one of a frequency chart indicating a change in a frequency band in an image, a character chart in which characters are written in the image, an object image in which a specific object whose image quality is desired to be improved is reflected in the image, and a color chart in which regions are divided for each color in the image.

<Modification 4>

In Modification 4, a method of deleting a redundant attention mechanism in consideration of the calculation cost of attention will be explained. First, the processing speeds of all the attention processing when an input image is provided to the neural network are measured.

The target value when the attention mechanism is deleted is determined based on the measurement result of the processing speed. For example, a target value when the total processing time of the attention processing is reduced by 20% is set as a target value. Next, redundant attention is detected in ascending order of the average value of the variance values of the weights of attention when a plurality of image quality evaluation images is given.

At this time, if the processing speed of the neural network when the attention mechanism as the target is deleted reaches the reduction of the processing time of 20% of the attention processing as the target value, the detection processing of the redundant attention mechanism stops.

Then, it is determined that an attention mechanism in which the average value of the variance values of the attention weights detected so far is small is a redundant attention mechanism. Thus, it is possible to improve the processing speed while suppressing a decrease in accuracy due to the deletion of an attention determined to be redundant. Thus, the redundant attention mechanism may be detected based on the statistic of the weight of the attention processing and the processing speed of the attention processing.

Second Embodiment

In the first embodiment, redundant attention is deleted from a noise removal network in which attention is incorporated, and a noise removal network having a faster processing speed is newly acquired.

In the second embodiment, an example will be explained in which redundant attention is deleted from a super-resolution network that executes super-resolution processing of converting a low-resolution image into a high-resolution image, and a super-resolution network having a faster processing speed is newly acquired. That is, in the second embodiment, when an image is input, the first and second neural networks output a high-resolution image.

The configuration of the functional blocks of the image processing apparatus in the second embodiment is similar to, for example, the configuration of the functional blocks of the first embodiment as shown in FIG. 2. In the second embodiment, the database unit 110 stores an image for image quality evaluation, and a low-resolution image and a high-resolution image serving as images for learning of the image processing for improving image quality. The second embodiment is executed in the same processing flow as the first embodiment. In the second embodiment, processes that are different from the first embodiment will be explained in detail below.

In step S313, the neural network executes super-resolution processing using a model learned so as to perform super-resolution processing. When a low-resolution image is given to the neural network as an input image, a high-resolution image is output.

Additionally, in step S322, a low-resolution image is acquired as an input image and a high-resolution image is acquired as a true value image. The newly acquired neural network is learned in the subsequent processes by using the acquired low-resolution image and high-resolution image.

By using the second embodiment configured as described above, even in a neural network in which super-resolution processing is performed, redundant attention is removed and a faster processing speed neural network can be acquired.

Third Embodiment

In the first embodiment, the activation determination of the attention processing with respect to a certain image quality evaluation item. In the third embodiment, an example will be explained in which a neural network is acquired in which a redundant attention mechanism is deleted while an attention mechanism that is effective in a certain image quality evaluation item remains by performing the activation determination using a plurality of different image quality evaluation images.

The configuration of the functional blocks of the image processing apparatus in the third embodiment is similar to the configuration of the functional blocks of the first embodiment as shown in, for example, FIG. 2, and is executed in the same processing flow as the first embodiment. In the third embodiment, processed that are different from the first embodiment will be explained in detail below.

Figure 10:
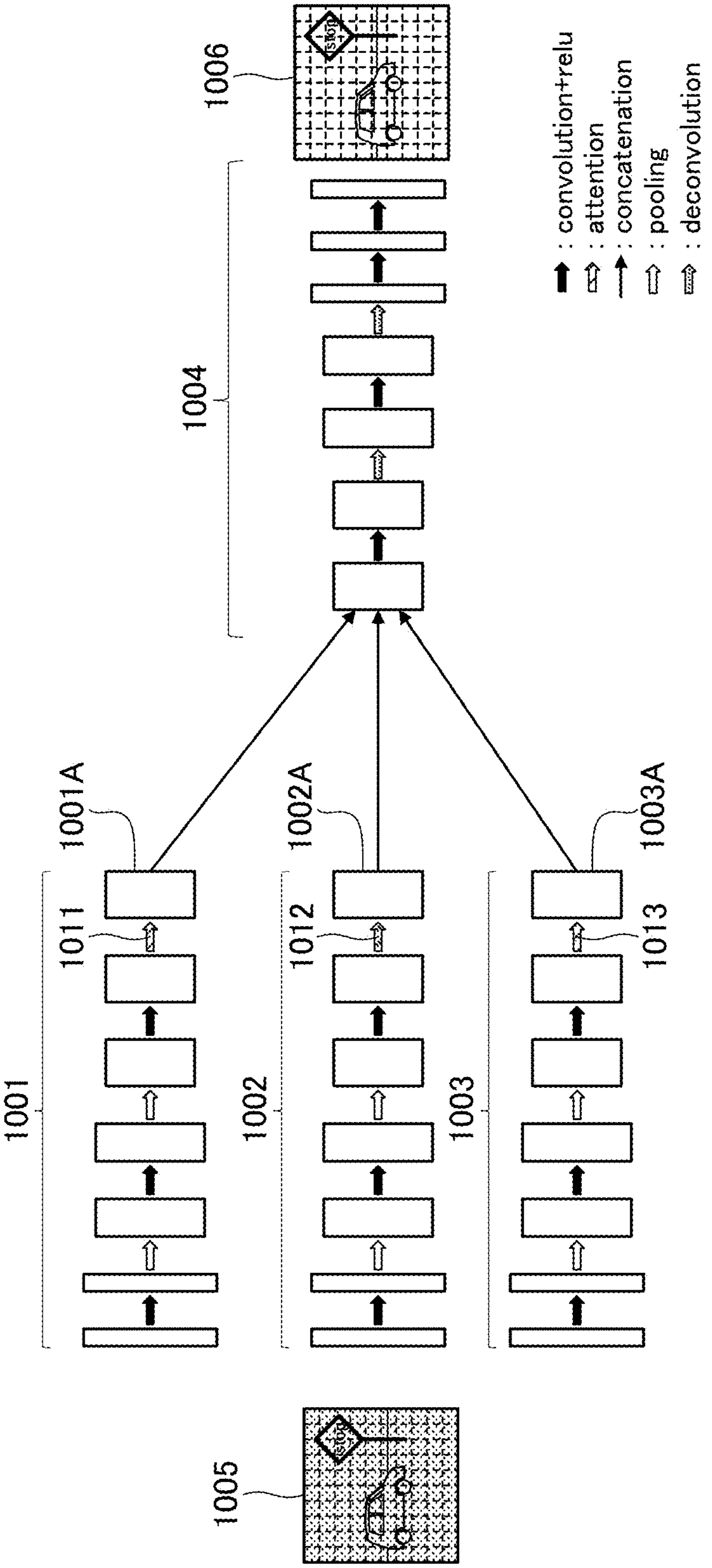
FIG. 10 is a functional block diagram showing a configuration example of a neural network according to the third embodiment.

FIG. 10 is a functional block diagram showing a configuration example of a neural network according to the third embodiment. The neural network in FIG. 10 is configured by a plurality of encoder units including encoder units 1001, 1002, and 1003 and a decoder unit 1004. When an input image 1005 is input, the encoder units 1001, 1002, and 1003 respectively generate feature amounts 1001A, 1002A, and 1003A.

In the process of generating the feature amounts 1001A, 1002A, and 1003A, attention processing is finally executed as in attention processing 1011, 1012, and 1013, and thereby, feature amounts are generated. Subsequently, each of the generated feature amounts are combined when being input to the decoder unit 1004, and are processed by the decoder unit 1004 so as to output a high-quality image 1006 having a desired resolution and a desired number of channels.

In the neural network configured as described above, it is desirable that feature amounts having different properties are generated in each of the encoder units. It is possible to generate feature amounts having different properties in each encoder unit by performing learning such that the weight of attention processing of each encoder unit is different using, for example, the method of Document 3 (Diversified Visual Attention Networks for Fine-Grained Object Classification, Bo Zhao., 2016.).

Alternatively, feature amounts having different properties in each encoder unit may be generated by the following method. First, one of the encoder units is connected to the decoder unit, and sufficient learning is performed so as to obtain a desired feature amount.

For example, a neural network consisting of the encoder unit 1001 and the decoder unit 1004 is configured, and learning is performed by giving a noise-added image and a clean image without noise of an image in which an automobile is reflected during learning. As a result, the encoder unit 1001 generates a feature amount specialized for an automobile image.

Similarly, the encoder unit 1002 generates a feature amount specialized for a character chart by giving a noise-added image and a clean image without noise of the character chart at the time of learning and performing learning.

It is possible to acquire a neural network in which noise removal is performed while each encoder unit generates different feature amounts by sufficiently learning the encoder units independently of each other, changing the structure to the network as shown in FIG. 10, and performing learning again.

Additionally, in the third embodiment, the activation determination for a plurality of attentions is performed. For example, in the third embodiment, the attention activation determination using a frequency chart as an image quality evaluation image is performed by using the method of Modification 1.

Additionally, the attention activation determination is performed by using an image in which a character chart is reflected in the image quality evaluation image by using the method of Modification 2. Furthermore, the attention activation determination is also performed using an image in which, for example, an automobile as a specific object image is reflected. Thus, the activation determination for weights of a plurality of types of attention processing is performed, and an attention mechanism determined to be inactive by any activation determination method is detected as a redundant attention mechanism.

For example, when the weight of the attention processing 1011 is determined to be inactive by using any of the character chart, the specific object image, and the frequency chart, the attention mechanism is detected as a redundant attention mechanism.

If the weight of the attention processing 1012 is determined to be active, for example, for the character chart among the three attention activation determinations, it is determined that the attention mechanism is not redundant. Alternatively, if even one is determined to be active, it is determined that the attention mechanism is not a redundant attention mechanism. Then, the detected redundant attention mechanism is deleted, and a new structure of the neural network is acquired.

Figure 11:
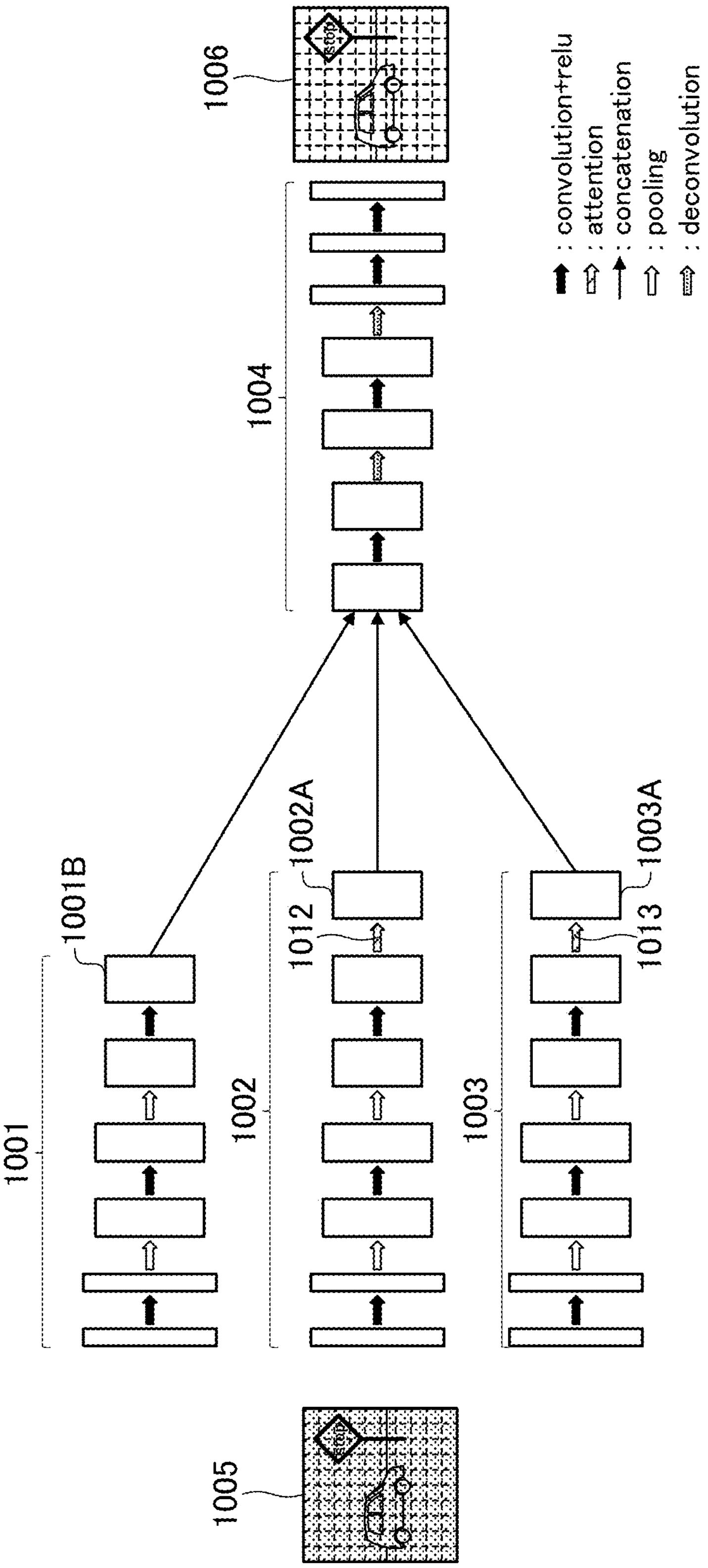
FIG. 11 is a functional block diagram showing a configuration example of a newly acquired neural network according to the third embodiment.

An example of the structure of the neural network newly acquired in this way is shown in FIG. 11. FIG. 11 is a functional block diagram showing a configuration example of a neural network newly acquired according to the third embodiment. In the neural network of FIG. 11, the feature amount 1001B generated without executing the redundant attention processing 1011 of the original neural network of FIG. 10 propagates in the network. The new neural network acquired as described above learns in the same manner as the first embodiment.

As described above, in the third embodiment, the activation determination for a plurality of different image quality evaluation images is performed. As a result, it is possible to acquire a neural network in which attention processing is executed only on a feature amount effective for at least one image quality evaluation item. Then, it is possible to acquire a neural network in which the speed reduction of the attention processing is suppressed while improving the image quality for the image quality item to be emphasized.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the information processing apparatus and the like through a network or various storage media. Then, a computer (or a CPU, an MPU, or the like) of the information processing apparatus and the like may be configured to read and execute the program. In such a case, the program and the storage medium storing the program configure the present invention. Then, a computer (or a CPU, an MPU, or the like) of the movable apparatus and the like may be configured to read and execute the program. In such a case, the program and the storage medium storing the program configure the present invention.

Additionally, the present invention also includes a configuration that can be realized by using, for example, at least one processor or a circuit configured to function as the embodiments described above. Note that a plurality of processors may be used to perform distributed processing.

This application claims the benefit of priority from Japanese Patent Application No. 2023-067814, filed on Apr. 18, 2023, which is hereby incorporated by reference herein in its entirety.

What is claimed is:

1. An information processing apparatus comprising:

at least one processor; and a memory coupled to the at least one processor, the memory storing instructions that, when executed by the at least one processor, cause the at least one processor to:

input an image to a first neural network in which an attention mechanism that performs image processing for improving image quality is included;

detect a redundant attention mechanism by determining whether or not a weight of attention processing generated in a process of the image processing is active;

acquire a second neural network by deleting the redundant attention mechanism from the first neural network such that a feature amount input to the redundant attention mechanism is propagated to a subsequent layer without being subjected to the attention processing by the redundant attention mechanism; and perform machine learning with the second neural network.

2. The information processing apparatus according to claim 1, wherein, in the detection, a statistic of a weight value of the attention processing is calculated, and it is determined whether or not a weight of the attention processing is active according to the statistic.

3. The information processing apparatus according to claim 1, wherein, in the detection, a variance value of a weight of the attention processing is calculated, and it is determined that the attention processing in which the variance value is equal to or less than a predetermined threshold is not active.

4. The information processing apparatus according to claim 1, wherein, in the detection, it is detected that the attention mechanism in which there are more weights of the inactive attention processing than the weight of the active attention processing, among weights of the attention processing acquired for each attention mechanism in a case in which one or more of the images are given, is redundant.

5. The information processing apparatus according to claim 1, wherein, in the detection, an average value of variances of weights of attention processing acquired in a case in which one or more of the images are given is calculated, and the attention mechanism that generates a weight of attention processing in which the average value is less than a predetermined threshold is detected as redundant.

6. The information processing apparatus according to claim 1, wherein the image input to the first neural network includes at least one of a frequency chart indicating a change in a frequency band in an image, a character chart in which characters are written in an image, an object image in which a specific object whose image quality is desired to be improved is reflected in an image, and a color chart in which regions are divided for each color in an image.

7. The information processing apparatus according to claim 1, wherein the attention mechanism incorporated in the first neural network includes an attention mechanism that generates a weight in a spatial direction of an input feature amount.

8. The information processing apparatus according to claim 1, wherein the attention mechanism incorporated in the first neural network includes an attention mechanism that generates a weight in a channel direction of an input feature amount.

9. The information processing apparatus according to claim 1, wherein, in the detection, a weight of the attention processing acquired in a case in which a frequency chart is given as an input of the first neural network is divided into regions for each frequency band, and a representative value of the weight is calculated for each region.

10. The information processing apparatus according to claim 9, wherein, in the detection, a difference value of representative values of weights between regions divided for each frequency band is calculated, and in a case in which the difference value is equal to or less than a predetermined threshold, it is determined that a weight of the attention processing is inactive.

11. The information processing apparatus according to claim 1, wherein, in the detection, a weight of the attention processing acquired in a case in which a character chart or an object image is given as an input of a neural network is divided into a character region or an object region, and a background region, and a representative value of a weight is calculated for each of the regions.

12. The information processing apparatus according to claim 11, wherein, in the detection, a difference value of representative values of weights between the character region or the object region, and the background region is calculated, and in a case in which the difference value is equal to or less than a predetermined threshold, it is determined that the weight of the attention processing is inactive.

13. The information processing apparatus according to claim 1, wherein, in the detection, a region is divided for each color and a representative value of the weight is calculated for each region, among weights of attention processing acquired in a case in which a color chart is given as an input of a neural network.

14. The information processing apparatus according to claim 1, wherein, in the detection, a difference value of representative values of weights between regions divided for each color is calculated, and it is determined that a weight of attention processing is inactive in a case in which the difference value is equal to or less than a predetermined threshold.

15. The information processing apparatus according to claim 1, wherein, in the detection, a redundant attention mechanism is detected based on a statistic of a weight of the attention processing and a processing speed of the attention processing.

16. The information processing apparatus according to claim 1, wherein the memory storing further instructions that, when executed by the at least one processor, cause the at least one processor to:

generate a plurality of feature amounts by the first and second neural networks, and restore the plurality of feature amounts as an image of a desired image processing execution result.

17. The information processing apparatus according to claim 1, wherein the memory storing further instructions that, when executed by the at least one processor, cause the at least one processor to:

generate feature amounts of a plurality of resolutions by the first and second neural networks, and restore the feature amounts of the plurality of resolutions as an image of a desired image processing execution result.

18. The information processing apparatus according to claim 1, wherein, in the detection, activation determination for weights of a plurality of types of attention processing is performed, and an attention mechanism determined to be inactive in any activation determination method is detected as a redundant attention mechanism.

19. The information processing apparatus according to claim 1, wherein the detecting includes calculating a statistic indicating variation of values of the weight of the attention processing generated by each attention mechanism, and determining that the attention mechanism is redundant when the statistic is equal to or less than a predetermined threshold.

20. The information processing apparatus according to claim 1, wherein the weight of the attention processing is a spatial weight having a plurality of elements corresponding to spatial positions of an input feature amount.

21. An information processing method comprising:

inputting an image to a first neural network in which an attention mechanism that performs image processing for improving image quality is included;

detecting a redundant attention mechanism by determining whether or not a weight of attention processing generated in a process of the image processing is active;

acquiring a second neural network by deleting the redundant attention mechanism from the first neural network such that a feature amount input to the redundant attention mechanism is propagated to a subsequent layer without being subjected to the attention processing by the redundant attention mechanism; and perform machine learning with the second neural network.

22. A non-transitory computer-readable storage medium configured to store a computer program comprising instructions for executing following processes:

inputting an image to a first neural network in which an attention mechanism that performs image processing for improving image quality is included;

detecting a redundant attention mechanism by determining whether or not a weight of attention processing generated in a process of the image processing is active;

acquiring a second neural network by deleting the redundant attention mechanism from the first neural network such that a feature amount input to the redundant attention mechanism is propagated to a subsequent layer without being subjected to the attention processing by the redundant attention mechanism; and perform machine learning with the second neural network.

* * * * *